US010963170B2

(12) United States Patent
Kumar et al.

(10) Patent No.: US 10,963,170 B2
(45) Date of Patent: Mar. 30, 2021

(54) RETAINING MEMORY DURING PARTIAL RECONFIGURATION

(71) Applicant: Xilinx, Inc., San Jose, CA (US)

(72) Inventors: Subodh Kumar, San Jose, CA (US); David P. Schultz, Longmont, CO (US); Weiguang Lu, San Jose, CA (US); Michelle Zeng, San Jose, CA (US)

(73) Assignee: XILINX, INC., San Jose, CA (US)

( * ) Notice: Subject to any disclaimer, the term of this patent is extended or adjusted under 35 U.S.C. 154(b) by 54 days.

(21) Appl. No.: 16/262,420

(22) Filed: Jan. 30, 2019

(65) Prior Publication Data

US 2020/0241770 A1    Jul. 30, 2020

(51) Int. Cl.
 *G06F 3/06* (2006.01)
(52) U.S. Cl.
 CPC .......... *G06F 3/0629* (2013.01); *G06F 3/0604* (2013.01); *G06F 3/0673* (2013.01)
(58) Field of Classification Search
 CPC .... G06F 3/0604; G06F 3/0605; G06F 3/0629; G06F 3/0632; G06F 3/0634; G06F 3/0637; G06F 3/0673
 See application file for complete search history.

(56) References Cited

U.S. PATENT DOCUMENTS

| | | | |
|---|---|---|---|
| 5,844,422 A | 12/1998 | Trimberger et al. | |
| 6,507,211 B1 * | 1/2003 | Schultz ............ | H03K 19/17728 326/37 |
| 6,525,562 B1 | 2/2003 | Schultz et al. | |
| 7,134,025 B1 * | 11/2006 | Trimberger ......... | G06F 12/1425 713/189 |
| 7,206,919 B2 * | 4/2007 | Goel ....................... | G06F 30/34 711/220 |
| 7,346,861 B1 * | 3/2008 | Lee ......................... | G06F 30/35 716/103 |
| 7,911,826 B1 * | 3/2011 | Liu .......................... | G11C 5/14 326/37 |
| 8,633,730 B1 * | 1/2014 | Tseng ..................... | G06F 1/24 326/38 |
| 8,786,310 B1 * | 7/2014 | Lu ......................... | G06F 30/331 326/41 |
| 9,722,613 B1 | 8/2017 | Schultz et al. | |
| 2016/0162193 A1 * | 6/2016 | Tanaka .................. | G06F 3/0659 711/154 |
| 2016/0224266 A1 * | 8/2016 | Kambegawa ......... | G06F 3/0629 |
| 2018/0032657 A1 * | 2/2018 | Matsumura ............. | G06F 21/34 |

* cited by examiner

*Primary Examiner* — Reginald G Bragdon
*Assistant Examiner* — Aaron D Ho
(74) *Attorney, Agent, or Firm* — Patterson + Sheridan, LLP (57) ABSTRACT

Embodiments herein describe a reconfigurable integrated circuit (IC) where data can be retained in memory when performing a partial reconfiguration. Partial reconfiguration includes reconfiguring programmable logic in the IC while certain functions of the IC remain operational or active. In one embodiment, the reconfigurable IC includes control logic for saving or retaining data in the IC during a partial reconfiguration. That is, rather than clearing the memory elements, the user can specify that the memory blocks containing certain data should be retained while the other memory blocks can be cleared. In this manner, the data can be retained in the IC during a partial reconfiguration which saves time, power, and cost. Once partial reconfiguration is complete, the newly configured programmable logic can retrieve and process the saved data from the on-chip memory.

19 Claims, 8 Drawing Sheets

RETAINING MEMORY DURING PARTIAL RECONFIGURATION

TECHNICAL FIELD

Examples of the present disclosure generally relate to retaining data during a partial reconfiguration.

BACKGROUND

Partial Reconfiguration allows for the dynamic change of modules within an active design. This flow can include multiple configurations which ultimately results in full bitstreams for each configuration, and partial bitstreams for each Reconfigurable Module. Generally, partial reconfiguration permits a reconfigurable device (e.g., a reconfigurable integrated circuit such as a field programmable gate array (FPGA), programmable logic device, and the like) to be reconfigured to perform a different function or functions while some portions of the device remain active—e.g., memory interfaces, PCIe interfaces, and the like.

When reconfiguring programmable logic in the device, the memory blocks in the device are typically cleared. Thus, any processed data generated when the device is in a first configuration is lost when the device is reconfigured into a second configuration.

SUMMARY

Techniques for retaining memory during a partial reconfiguration are described. One example is a reconfigurable integrated circuit, the circuit including programmable logic, a memory block including a memory array, and control logic. The control logic is configured to process first data using a first configuration of the programmable logic, store the first data in the memory block, and reconfigure the programmable logic into a second configuration where reconfiguring the programmable logic includes determining that a save signal indicates the memory block stores data that should be retained during reconfiguration and retaining the first data in the memory block when reconfiguring the programmable logic. The control logic also processes the first data using the second configuration of the programmable logic.

Another example herein is a method that includes processing first data using a first configuration of programmable logic in an integrated circuit, storing the first data in a memory block in the integrated circuit, and reconfiguring the programmable logic into a second configuration, where reconfiguring the programmable logic includes determining that the memory block stores data that should be retained during reconfiguration and retaining the first data in the memory block when reconfiguring the programmable logic. The method also includes processing the first data using the second configuration of the programmable logic.

Another example herein is a reconfigurable integrated circuit that includes programmable logic, a memory block comprising a memory array, and control logic configured to configure the programmable logic into a first configuration and reconfigure the programmable logic into a second configuration, where reconfiguring the programmable logic includes determining that the memory block stores data that should be retained during reconfiguration and retaining the data in the memory block when reconfiguring the programmable logic.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

Embodiments herein describe reconfigurable integrated circuits (ICs)

To facilitate understanding, identical reference numerals have been used, where possible, to designate identical elements that are common to the figures. It is contemplated that elements of one example may be beneficially incorporated in other examples.

DETAILED DESCRIPTION

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe a reconfigurable integrated circuit (IC) where user data can be stored when performing a partial reconfiguration. As discussed above, in one embodiment, a partial reconfiguration includes reconfiguring programmable logic in the IC while certain functions of the IC remain operational or active (e.g., memory interfaces, PCIe interfaces, and the like). For example, the reconfigurable IC may be used to perform a multi-stage operation where the configuration of the IC is changed during each stage. For example, the IC may be initially configured to perform stage one and then a partial reconfiguration is performed to configure the IC to perform stage two. Because partial reconfiguration may delete or clear the in-chip memory elements, the user data processed when the IC is configured for stage one is offloaded from the IC, stored in external memory, and then reloaded into the IC once partial reconfiguration is complete and the IC is ready to perform stage two. Having to offload and then reload the processed data is time consuming and costly.

In one embodiment, the reconfigurable IC includes control logic for saving or retaining user data in the IC during a partial reconfiguration. That is, rather than clearing the memory elements, the user can specify that the memory blocks containing user data should be retained while the other memory blocks can be cleared. In this manner, the user data can remain on the IC during a partial reconfiguration which saves time, power, and cost (since additional external memory is not needed). Once partial reconfiguration is complete, the newly configured programmable logic can retrieve and process the saved user data from the on-chip memory.

Figure 1A:
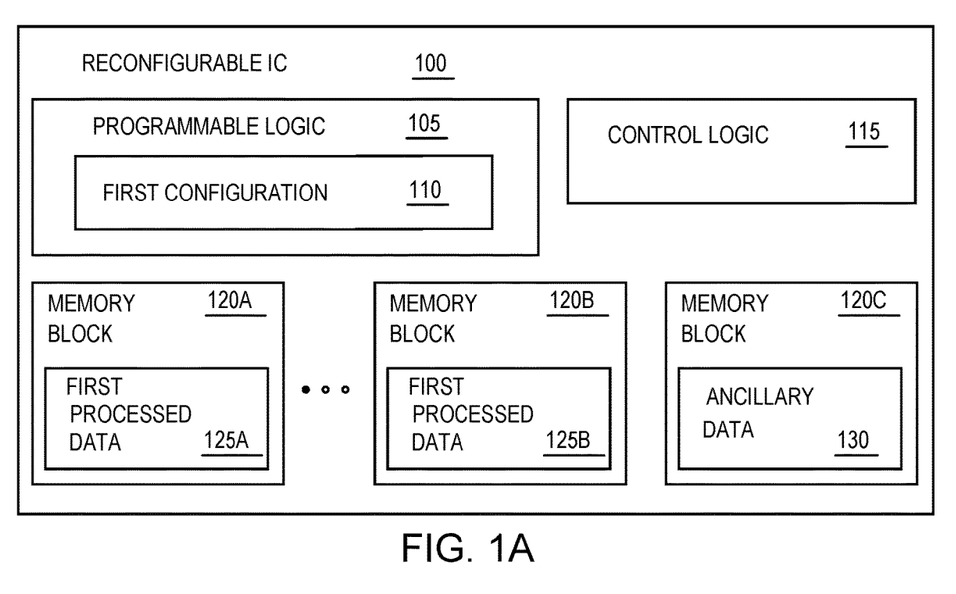
FIGS. 1A-1C illustrate retaining data in memory when reconfiguring an integrated circuit, according to an example.
Figure 1B:
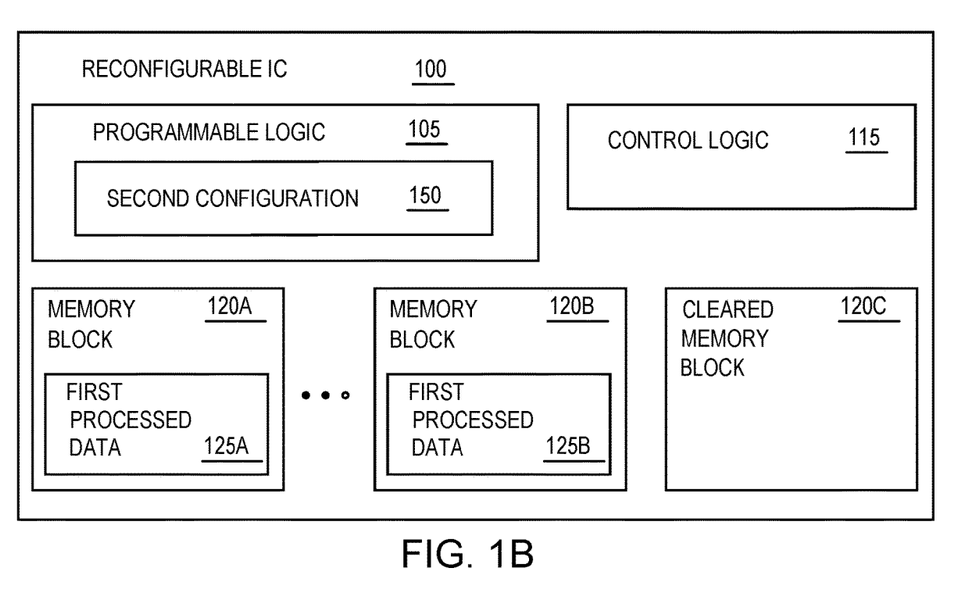
Figure 1C:
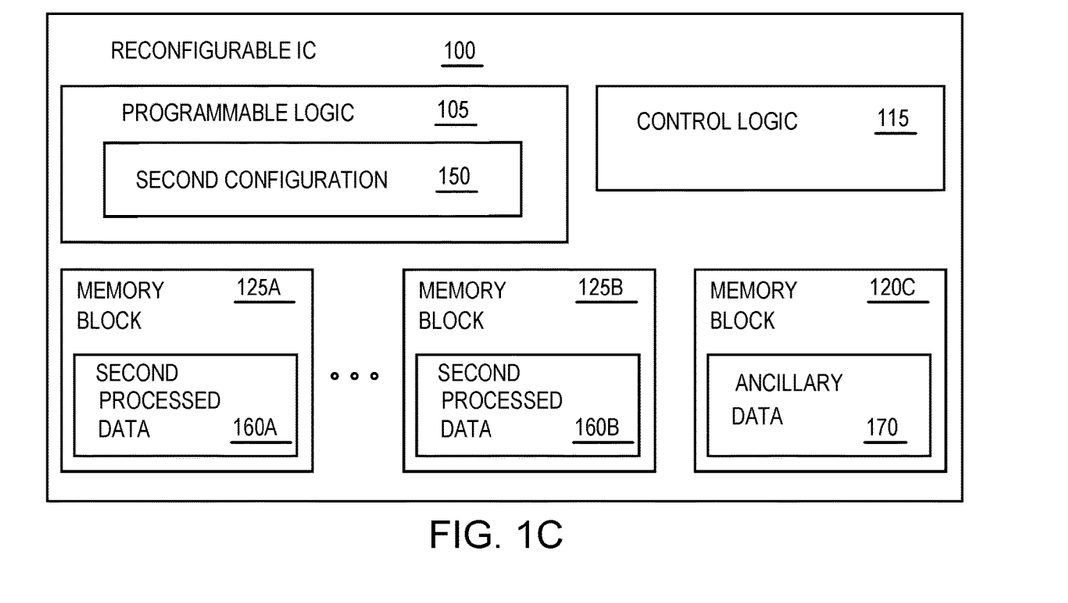

FIGS. 1A-1C illustrate retaining data in memory when reconfiguring an integrated circuit, according to an example. FIG. 1A illustrates a reconfigurable IC 100 that includes programmable logic 105 which is currently configured into a first configuration 110. For example, using a received bitstream that contains configuration data, control logic 115 can configure the programmable logic 105 (which can include a plurality of configurable logic blocks) into the first configuration 110. For example, the programmable logic 105 can include look up tables, function generators, registers, multiplexers, and the like.

The IC 100 also includes memory blocks 120. The detailed circuitry within the memory blocks 120 is described below, but can include any type of volatile or non-volatile memory. In one embodiment, the memory blocks 120 include an array of memory elements. In FIG. 1A, the memory blocks 120A and 120B store first processed data 125A and 125B. In one embodiment, the first processed data 125A and 125B is user data that was processed and generated by the programmable logic 105 when in the first configuration 110. As mentioned above, the IC 100 may be used in an iterative process (e.g., a multi-stage process) where the data 125 is processed at each stage by the programmable logic 105.

Unlike the memory blocks 120A and 120B, the memory block 120C stores ancillary data 130. The ancillary data 130 can be any data which does not need to be saved when the programmable logic 105 is reconfigured, e.g., during a partial reconfiguration. For example, unlike the first processed data 125A and 125B, the ancillary data 130 may not be processed by the programmable logic 105 after being reconfigured.

FIG. 1B illustrates the result of reconfiguring the IC 100. Although performing a partial reconfiguration is described herein, the embodiments are limited to such. The examples herein can be useful in any type of reconfiguration process where data generated using a first configuration is then processed using a second, different configuration of the IC 100.

At the end of the partial reconfiguration, the programmable logic 105 now has a second configuration 150 which is different from the first configuration 110. For example, the IC 100 may have received a bitstream that the control logic 115 used to configure the programmable logic 105 into the second configuration 150.

When performing partial reconfiguration, the control logic 115 cleared the memory block 120C but retained the data in the memory blocks 120A and 120B. That is, during reconfiguration, the control logic 115 cleared or deleted the ancillary data 130 from the memory block 120C but retained the first processed data 125A and 125B in the memory blocks 120A and 120B. Thus, once partial reconfiguration is complete, the programmable logic 105 can retrieve the first processed data 125A and 125B directly from the memory blocks 120. Alternatively, if the control logic 115 did not have the ability to retain the data during a partial reconfiguration, the IC 100 would first have to offload the data it wants saved into an external memory and then reload that data into the memory blocks following the completion of the partial reconfiguration. Thus, retaining the first processed data 125A and 125B in memory in the IC 100 can save time, power (since the IC does not have to transmit and then receive the data), and cost since an external memory to save the data 125 is not needed.

FIG. 1C illustrates that the programmable logic 105, which is in the second configuration 150, has processed the first processed data to generate second processed data 160A and 160B which is stored in the memory blocks 120A and 120B. Although not shown, the control logic 115 can again perform a partial reconfiguration where the second processing data 160A and 160B is saved in the memory blocks 120A and 120B while ancillary data 170 (which may not be used after the IC 100 is reconfigured) can be cleared from memory block 120C.

Figure 2:
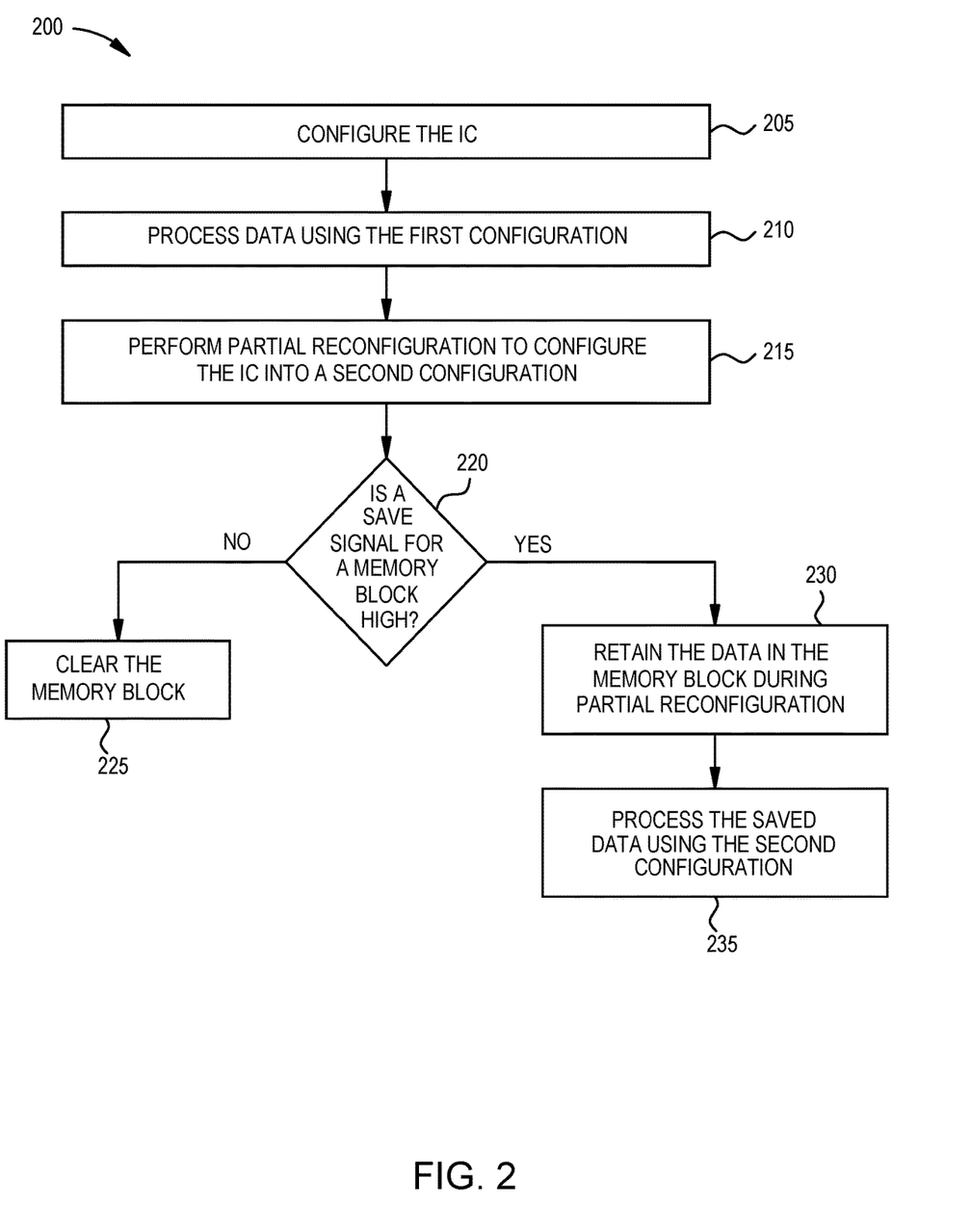
FIG. 2 is a flowchart for retaining data in memory when performing a partial reconfiguration, according to an example.

FIG. 2 is a flowchart of a method 200 for retaining data in memory when performing a partial reconfiguration, according to an example. At block 205, control logic configures the reconfigurable IC using a received bitstream. That is, the bitstream can include configuration data that configures programmable logic in the IC to perform a first configuration which has a corresponding function or set of functions.

At block 210, the programmable logic processes data using the first configuration. For example, the first configuration may be part of a first stage in a multi-stage process where user data is processed at each stage. That is, user data processed by stage 1 is then processed by stage 2, and then by stage 3, and so forth.

At block 215, the control logic in the IC performs partial reconfiguration to configure the IC into a second configuration. In one embodiment, the IC receives a new bitstream with configuration data for the second configuration. The IC uses the bitstream to reconfigure the programmable logic to perform a function or set of functions in the second configuration that are different than the functions established by the first configuration.

At block 220, as part of performing partial reconfiguration, the control logic determines whether a save signal for a memory block is high. In one embodiment, the control logic may establish a save signal for each of the memory block. For example, when instructing the IC to perform a partial reconfiguration, a user can indicate which memory blocks contain data that should be retained and which do not. The save signals for the memory blocks containing data to be retained can be high while the save signals for the memory blocks containing data the user does not want to save can be low. In this manner, the user can indicate on a per memory block level, which memory blocks to retain the data and which memory blocks should be cleared.

If the save signal for a memory block is low, the method 200 proceeds to block 225 where the control logic clear the memory block. Thus, any data stored in that memory block is deleted as part of performing partial reconfiguration.

However, if the save signal is high, the method 200 proceeds to block 230 where the control logic retains the data in the memory block during partial reconfiguration. Thus, after the programmable logic has been reconfigured into the second configuration, the data generated when the programmable logic was in the first configuration remains stored in the memory block.

At block 235, the programmable logic, which is now in the second configuration, processes the saved data using the second configuration. The processed data can again be saved into the memory blocks and retained if the user instructs the IC to perform another partial reconfiguration.

Figure 3:
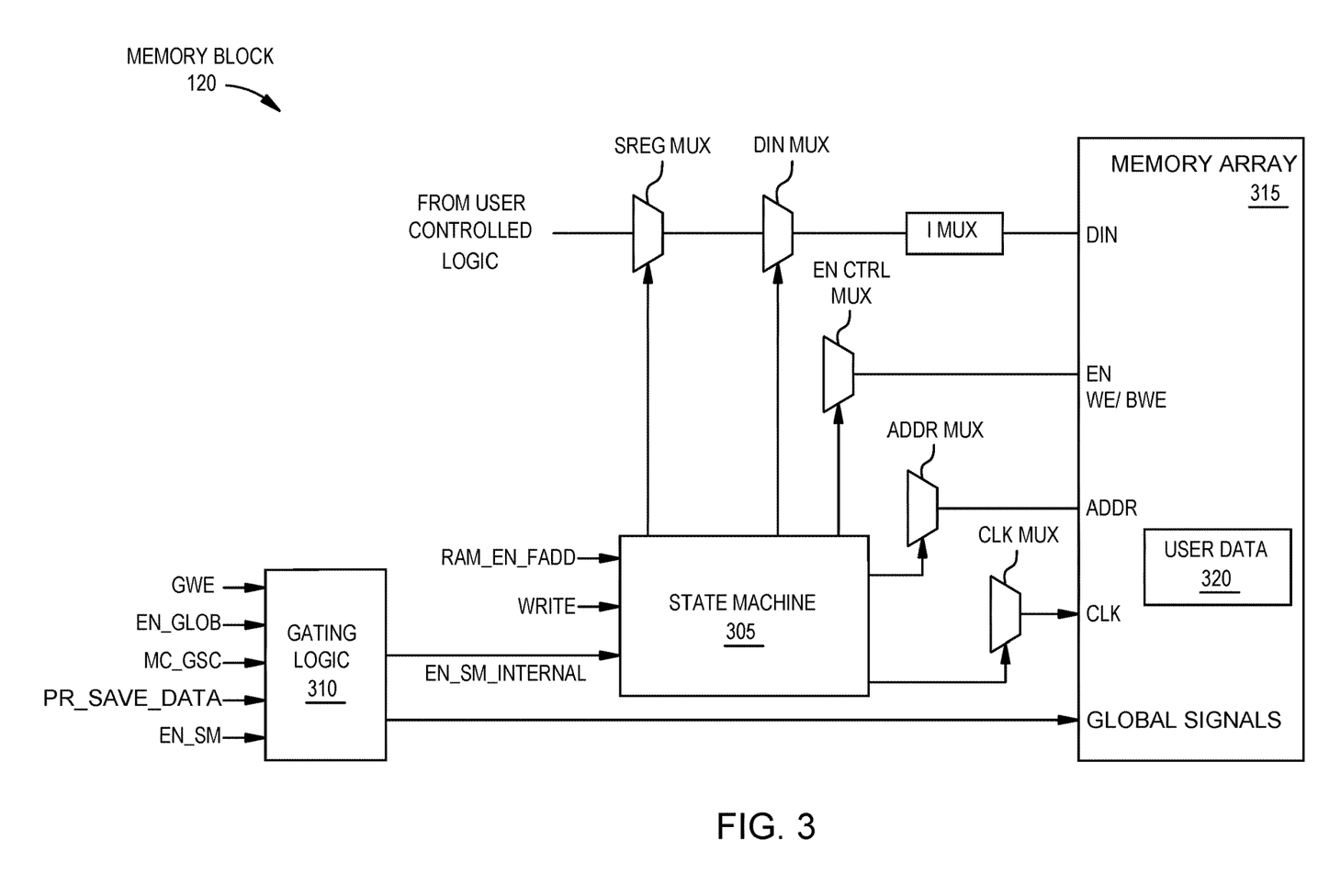
FIG. 3 illustrates circuitry for retaining data in memory during a partial reconfiguration, according to an example.

FIG. 3 illustrates circuitry for retaining data in the memory block 120 during a partial reconfiguration, according to an example. As shown, the memory block 120 include various multiplexers—i.e., SREG MUX, DIN MUX, EN CTRL MUX, ADDR MUX, and CLK MUX—which are controlled by select signals generated by a state machine 305. For clarity, many of the inputs for the multiplexers are not shown. The outputs of the multiplexers are coupled to a memory array 315 (e.g., a SRAM or DRAM memory array) which stores user data 320. Generally, the signals outputted by the multiplexers can be used to write data into the array 315, read data from the array 315, or clear the data in the array 315. For example, the state machine 305 may use the selector signals to clear the user data 320 when doing a partial configuration. However, if the user does not want to clear the user data 320 during a partial reconfiguration, the state machine 305 can be disabled as described below.

The memory block 120 also includes gating logic 310 that receives a save signal (i.e., the PR_SAVE_DATA signal) which determines whether the memory block 120 deletes the user data 320 or retains the user data 320 during a partial reconfiguration. In one embodiment, the EN_SM signal controls when to perform partial reconfiguration. If the EN_SM signal indicates that a partial reconfiguration is being performed, the gating logic 310 can enable the state machine 305 using the EN_SM_INTERNAL signal. Based on this signal (and the rest of the input signals—e.g., the RAM_EN_FADD and the WRITE signals), the state machine 305 controls the selector signals of the multiplexers to clear the user data 320 from the memory array 315.

However, in one embodiment, the gating logic 310 enables the state machine 305 (e.g., changes the EN_SM_INTERNAL signal to a high state) when the EN_SM signal is high and the PR_SAVE_DATA is low. Put differently, the gating logic 310 enables the state machine 305 when a partial reconfiguration is being performed and the user does not want to save the user data 320 stored in the memory array 315. For example, the WRITE signal and the EN_SM_INTERNAL signal may be high which permits the state machine 305 to delete or overwrite the user data 320.

If, however, the PR_SAVE_DATE signal is high (indicating the user does want to store the user data 320 during the partial reconfiguration), the gating logic 310 disables the state machine 305—e.g., the EN_SM_SIGNAL is low—in which case the user data 320 is retained in the memory array 315 throughout partial reconfiguration. Stated differently, the gating logic 310 uses the state of the PR_SAVE_DATA signal to block or stop the EN_SM signal from enabling the state machine 305 when the user data 320 should be retained within the memory array 315 during a partial reconfiguration. Of course, the EN_SM_INTERNAL signal may be high, thereby enabling the state machine 305, during other times other than when performing partial reconfiguration such as when the data in the array 315 is being read or written during normal operation.

While the description above described various signals as having high or low states or values, the embodiments herein are not limited to such. Further, the signals can be reversed from what is stated above. For example, a low value of the PR_SAVE_DATA signal may indicate that the user data 320 should be retained while a high value indicates the user data 320 should be cleared.

Figure 4:
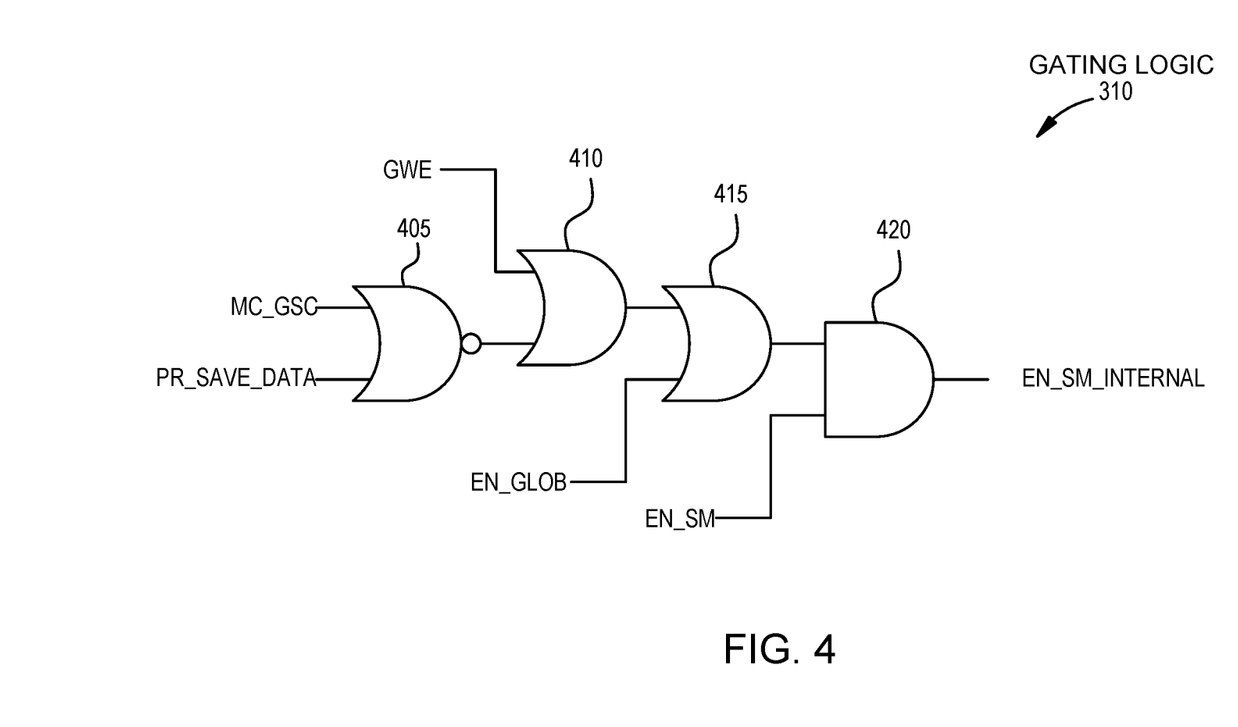
FIG. 4 illustrates gating logic circuitry for controlling when to retain data or delete data from a memory block, according to an example.

FIG. 4 illustrates gating logic 310 for controlling when to retain data or delete data from a memory block, according to an example. That is, FIG. 4 illustrates one example of circuitry for implementing the gating logic 310 in FIG. 3. The inputs into the various logic gates illustrated in FIG. 4 are the same inputs as those shown in FIG. 3.

The GWE signal is a global write enable signal which may be distributed through the IC to prevent state changes while the block is being reconfigured. The MC_GSC signal is a memory cell that masks the global signal in a functional block (e.g., the memory block) and permits the control logic to individually select or address the block. In one embodiment, the various functional blocks in the IC (e.g., memory blocks, configuration memory blocks, digital signal processing blocks, etc.) may have their own MC_GCS signal.

The EN_GLOB signal is a global enable signal used to ignore MC_GSC and PR_SAVE_DATA state during initial programming of the IC. In one embodiment, during partial reconfiguration the EN_GLOB has a low value. The EN_SM signal was described above and controls when to enable the state machine to perform a read or write. In this embodiment, the EN_SM is high during partial reconfiguration so the state machine can clear the memory array.

The PR_SAVE_DATA signal is a memory cell that controls whether the data stored in the memory block is deleted or retained during a partial reconfiguration. After initial configuration, EN_GLOB is low forever. GWE will go low during partial reconfiguration. When the block is in partial reconfiguration region, MC_GSC is also low. It's up to PR_SAVE_DATA to decide whether EN_SM_INTERNAL is allowed to go high. If PR_SAVE_DATA is high, gate 405 will be low, and gate 410, 415 will be low, hence the input into AND 420 is low, and disables EN_SM_.

However, in one embodiment, whenever the PR_SAVE_DATA signal is high, the EN_SM_INTERNAL signal is low, thereby disabling the state machine. In one embodiment, both the PR_SAVE_DATA and the MC_GSC signals are not high at the same time. As explained above, if both of these signals were low, than a logical high value would be passed to the AND gate 420, and since both inputs would be high, the EN_SM_INTERNAL signal would also be high thereby activating the state machine. Thus, in one embodiment, when the PR_SAVE_DATA signal is high, the MC_GSC signal is always low (along with the GWE and EN_GLOB signals) so that the PR_SAVE_DATA signal can block the EN_SM signal from enabling the state machine.

The logic gates in FIG. 4 are just one example of using a save data signal to enable or disable the state machine during partial reconfiguration. There are many more different combinations of logic gates that can perform the same function. Moreover, the types and number of logic gates can vary depending on the type of signals used in the reconfigurable IC. For example, other ICs may have a different number of inputs for the gating logic 310 or may use different types of signals to control when data is written to, read from, or cleared in the memory array.

Figure 5:
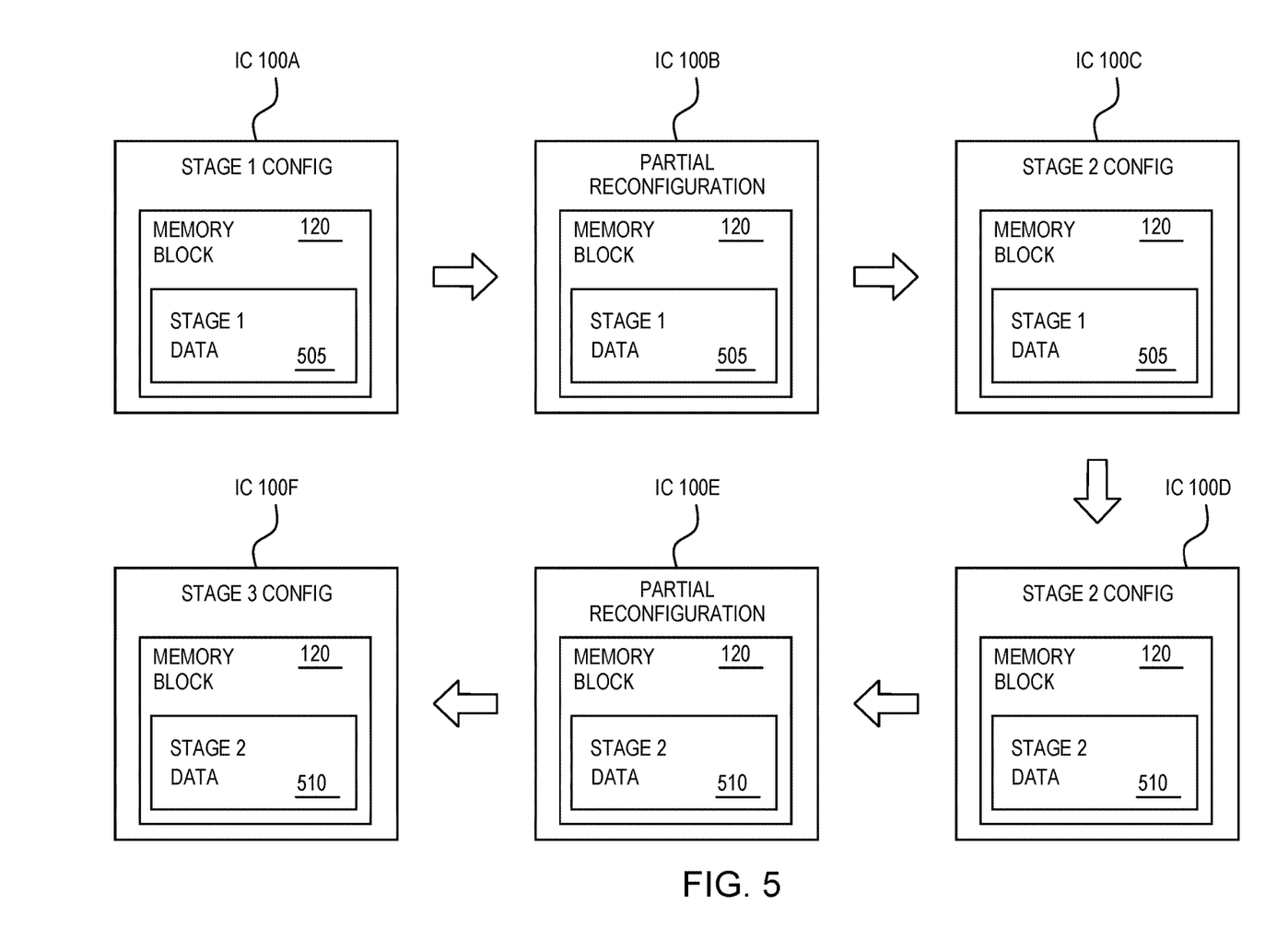
FIG. 5 illustrates retaining processed data between different configuration stages, according to an example.

FIG. 5 illustrates retaining processed data between different configuration stages, according to an example. Specifically, FIG. 5 illustrates six different states of the same IC 100 which are captured at six different times. That is, IC 100A illustrates the state of the IC during a first time period, IC 100B illustrates the state of the IC during a second time period, IC 100C illustrates the state of the IC during a third time period, and so forth. In one embodiment, the IC 100A-100F illustrate processing data using a multi-stage flow.

At the time period illustrated by IC 100A, the programmable logic has a stage 1 configuration. For example, stage 1 may be the first stage in the multi-stage flow. User data may come from external source or generated internally, and is processed by the programmable logic when in the stage 1 configuration and then saved as stage 1 data 505 in the memory block 120.

Once the user data has all been processed, the IC performs partial configuration as illustrated by the IC 100B. The memory block 120 can use the circuitry and techniques described above to ensure the stage 1 data 505 is retained throughout partial reconfiguration.

Once partial reconfiguration is complete, the programmable logic now has a stage 2 configuration as illustrated by IC 100C. The stage 1 data 505 is retained in the memory block 120 throughout the partial reconfiguration process and can now be processed by the programmable logic using the stage 2 configuration.

The IC 100D illustrates processing the stage 1 data 505 using the stage 2 configuration to result in stage 2 data 510 which is stored in the memory block 120. That is, rather than moving the stage 1 data 505 out of the IC when performing the partial reconfiguration, the stage 1 data 505 remains stored in the memory block 120 and thus is accessible for processing without having to reload the data 505 back into the IC 100.

Once all the data has been processed, partial reconfiguration can again be performed as shown by the IC 100E. Again, the control signals can be set so that the memory block 120 retains the stage 2 data 510 throughout partial reconfiguration.

The IC 100F indicates the programmable logic now has a stage 3 configuration which can be used to process the stage 2 data 510 which remains stored in the memory block 120 throughout partial reconfiguration. The process flow in FIG. 5 can repeat for as many stages as there are in the multi-stage flow where the data generated by each previous stage can be saved on the IC and is ready for processing when the IC is reconfigured into the subsequent stage.

Figure 6:
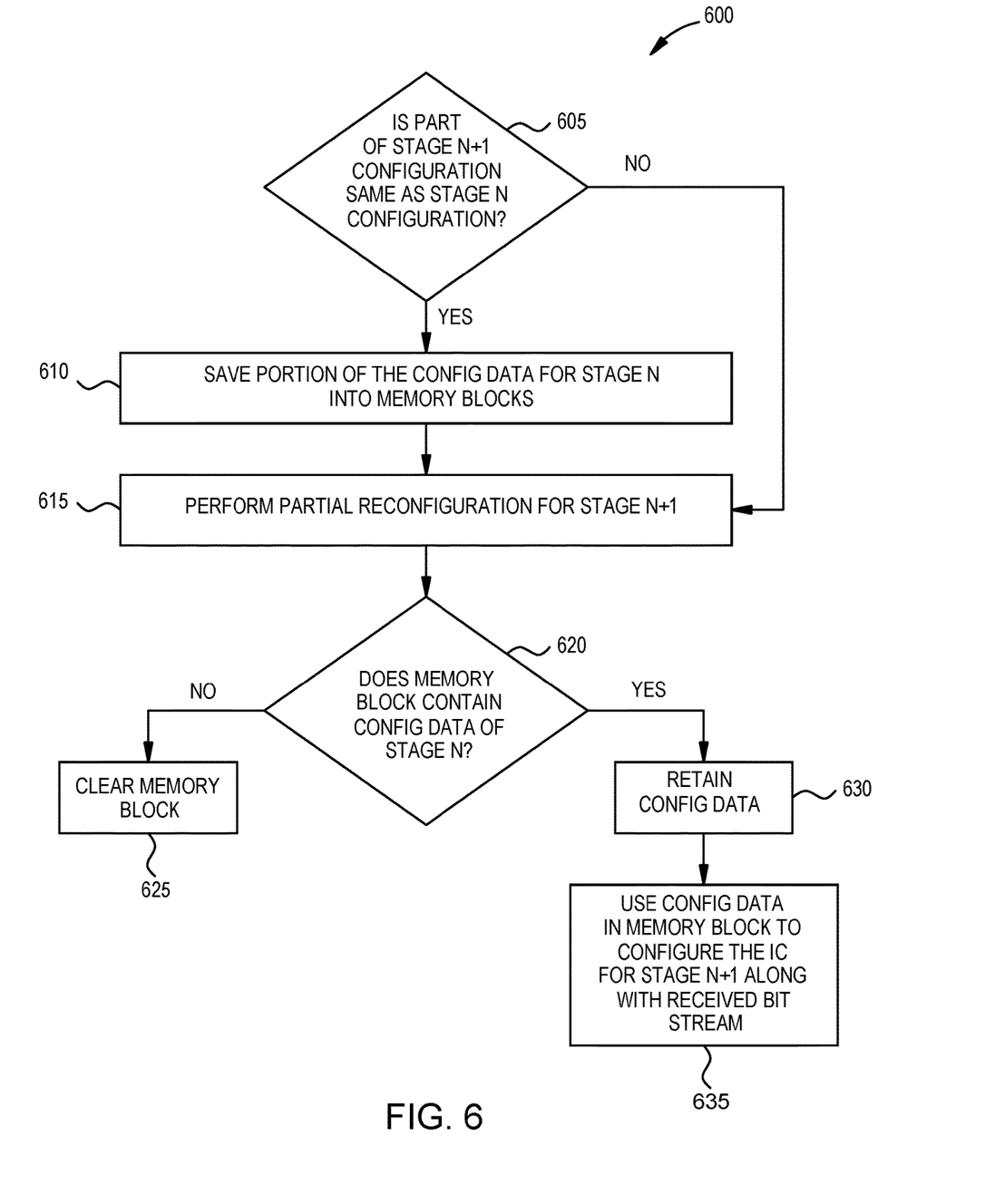
FIG. 6 is a flowchart for re-using configuration data between configuration stages when performing a partial reconfiguration, according to an example.

FIG. 6 is a flowchart of a method 600 for re-using configuration data between configuration stages when performing a partial reconfiguration, according to an example. While the previous embodiment discussed retaining or saving user data when reconfiguring the IC, the method 600 describes techniques for retaining or saving configuration data. In one embodiment, a portion of the configuration data used to configure the programmable logic in the previous stage can be reused to configure the programmable logic for the next stage. Doing so can reduce the bitstream used to perform a partial reconfiguration that can result in partial reconfiguration being performed in less time relative to transmitting complete bitstreams to the IC whenever a partial reconfiguration is performed.

At block 605, the user determines whether part of a configuration for stage N+1 (i.e., the next stage in the multi-stage flow) is the same as a configuration for stage N (i.e., the current stage in the multi-stage flow). That is, the user determines whether a portion of the configuration data used when configuring the IC for stage N can be used to configure a portion of the next stage—i.e., stage N+1. For example, the stages may have some overlapping functions which configure the programmable logic in the same manner. If so, the configuration data for performing these functions may be the same.

If a portion of the configuration data for the current stage can be used to configure the programmable logic for the next stage, the method 600 proceeds to block 610. If not, the method 600 skips to block 615.

At block 610, the IC saves the portion of the configuration data for stage N which can be used to configure at least a portion of stage N+1 into the memory blocks. For example, the configuration data may initially be stored in configuration logic blocks that configure the programmable logic. The IC can move the configuration data that overlaps with the next stage into the memory blocks typically used to store user data—e.g., the memory block 120 illustrated in FIG. 3.

At block 615, the IC performs partial reconfiguration for stage N+1. As part of doing so, at block 620, the IC determines whether a memory block contains configuration data of stage N. That is, the IC determines whether the memory block contains the configuration data identified at block 610. In one embodiment, when storing the configuration data in the memory blocks, the IC may store a flag indicating that those memory blocks should not be cleared during partial reconfiguration.

Moreover, the method 600 can be used in tandem with method 200 which evaluates whether the memory blocks contain user data which is going to be processed in the next stage—i.e., stage N+1. Thus, at block 620, the data may be retained when the memory block has either configuration data or user data that will be processed in the next stage.

If the memory blocks do not contain configuration data (or user data that will be processed in the next stage), the method 600 proceeds to block 625 where the memory array in the memory block is cleared. Otherwise, the method 600 proceeds to block 630 where the data in the memory block is retained.

At block 635, the IC uses the configuration data retained in the memory block to configure the IC for stage N+1 along with a received bit stream. That is, rather than relying solely on a bitstream received from an external source, the IC can at least partially configure the programmable logic for the next stage using configuration data used in the previous stage. Retrieving configuration data from the memory blocks may be significantly faster than receiving all of the configuration data via the bitstream transmitted from the external source. Thus, leveraging configuration data already stored in the IC to reconfigure the IC for the next stage can reduce the overall time used to perform partial reconfiguration.

Figure 7:
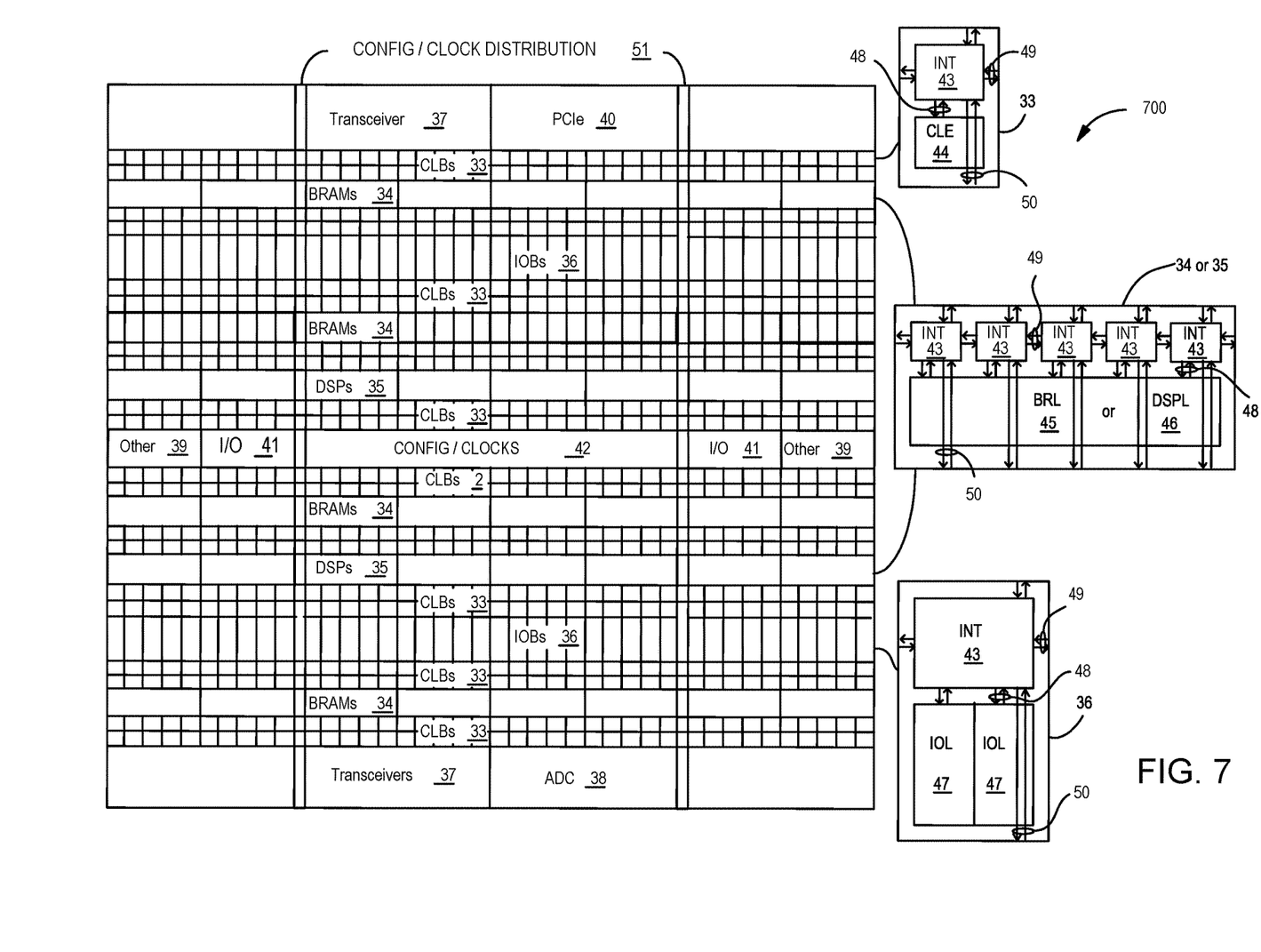
FIG. 7 illustrates a field programmable gate array implementation of a programmable IC according to an example.

FIG. 7 illustrates an FPGA 700 implementation of the IC 100 that includes a large number of different programmable tiles including transceivers 37, CLBs 33, BRAMs 34, input/output blocks ("IOBs") 36, configuration and clocking logic ("CONFIG/CLOCKS") 42, DSP blocks 35, specialized input/output blocks ("I/O") 41 (e.g., configuration ports and clock ports), and other programmable logic 39 such as digital clock managers, analog-to-digital converters, system monitoring logic, and so forth. The FPGA can also include PCIe interfaces 40, analog-to-digital converters (ADC) 38, and the like.

In some FPGAs, each programmable tile can include at least one programmable interconnect element ("INT") 43 having connections to input and output terminals 48 of a programmable logic element within the same tile, as shown by examples included at the top of FIG. 7. Each programmable interconnect element 43 can also include connections to interconnect segments 49 of adjacent programmable interconnect element(s) in the same tile or other tile(s). Each programmable interconnect element 43 can also include connections to interconnect segments 50 of general routing resources between logic blocks (not shown). The general routing resources can include routing channels between logic blocks (not shown) comprising tracks of interconnect segments (e.g., interconnect segments 50) and switch blocks (not shown) for connecting interconnect segments. The interconnect segments of the general routing resources (e.g., interconnect segments 50) can span one or more logic blocks. The programmable interconnect elements 43 taken together with the general routing resources implement a programmable interconnect structure ("programmable interconnect") for the illustrated FPGA.

In an example implementation, a CLB 33 can include a configurable logic element ("CLE") 44 that can be programmed to implement user logic plus a single programmable interconnect element ("INT") 43. A BRAM 34 can include a BRAM logic element ("BRL") 45 in addition to one or more programmable interconnect elements. In one embodiment, the BRAM 34 is one of the memory blocks 120 which can retain stored data during reconfigurations as described above. Typically, the number of interconnect elements included in a tile depends on the height of the tile. In the pictured example, a BRAM tile has the same height as five CLBs, but other numbers (e.g., four) can also be used. A DSP tile 35 can include a DSP logic element ("DSPL") 46 in addition to an appropriate number of programmable interconnect elements. An 10B 36 can include, for example, two instances of an input/output logic element ("IOL") 47 in addition to one instance of the programmable interconnect element 43. As will be clear to those of skill in the art, the actual I/O pads connected, for example, to the I/O logic element 47 typically are not confined to the area of the input/output logic element 47.

In the pictured example, a horizontal area near the center of the die (shown in FIG. 7) is used for configuration, clock, and other control logic. Vertical columns 51 extending from this horizontal area or column are used to distribute the clocks and configuration signals across the breadth of the FPGA.

Some FPGAs utilizing the architecture illustrated in FIG. 7 include additional logic blocks that disrupt the regular columnar structure making up a large part of the FPGA. The additional logic blocks can be programmable blocks and/or dedicated logic.

Note that FIG. 7 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 7 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A reconfigurable integrated circuit, comprising:
   programmable logic;
   a memory array;
   control logic configured to:
      process first data using a first configuration of the programmable logic;
      store the first data in the memory array;
      reconfigure the programmable logic into a second configuration, wherein reconfiguring the programmable logic comprises:
         determining that a save signal indicates the memory array stores data that should be retained during reconfiguration;
         retaining the first data in the memory array when reconfiguring the programmable logic; and
         process the first data using the second configuration of the programmable logic;
   a state machine for clearing the memory array block when reconfiguring the programmable logic, wherein the state machine is external to the memory array; and
   gating logic configured to enable the state machine when reconfiguring the programmable logic so that the memory array is cleared and disable the state machine when reconfiguring the programmable logic so that the first data is retained in the memory array, wherein the gating logic receives the save signal indicating whether the memory array stores data that should be retained during reconfiguration and a masking signal that masks a global write enable signal.

2. The reconfigurable integrated circuit of claim 1, comprising:
   a second memory array,
   wherein the control logic is configured to:
      determine that a second save signal indicates the second memory array stores data that should be cleared during reconfiguration, and
      clear the second memory array during reconfiguration.

3. The reconfigurable integrated circuit of claim 1, wherein reconfiguring the programmable logic comprises performing a partial reconfiguration where at least one communication interface in the reconfigurable integrated circuit remains active.

4. The reconfigurable integrated circuit of claim 1,
   wherein the gating logic is configured to determine whether to enable the state machine in response to the save signal.

5. The reconfigurable integrated circuit of claim 4, wherein the gating logic is configured to disable the state machine when the save signal indicates the data should be retained in the memory array during reconfiguration.

6. The reconfigurable integrated circuit of claim 5, wherein the gating logic is configured to enable the state machine when the save signal indicates the data should be cleared from the memory array.

7. The reconfigurable integrated circuit of claim 1, wherein the control logic is configured to receive from a user an indication whether the data in the memory array should be retained during reconfiguration.

8. A method, comprising:
   processing first data using a first configuration of programmable logic in an integrated circuit;
   storing the first data in a memory array in the integrated circuit;
   reconfiguring the programmable logic into a second configuration, wherein reconfiguring the programmable logic comprises:
      determining that the memory array stores data that should be retained during reconfiguration, and
      retaining the first data in the memory array when reconfiguring the programmable logic;
   processing the first data using the second configuration of the programmable logic;
   clearing the memory array when reconfiguring the programmable logic using a state machine external to the memory array; and
   determining whether to enable or disable the state machine when reconfiguring the programmable logic using gating logic, wherein the gating logic receives a save signal indicating whether the memory array stores data that should be retained during reconfiguration and a masking signal that masks a global write enable signal.

9. The method of claim 8, further comprising:
  determining that a second memory array in the integrated circuit stores data that should be cleared during reconfiguration; and
  clearing the second memory array during reconfiguration.

10. The method of claim 9, wherein determining that the second memory array should be cleared further comprises:
  enabling the state machine using an output of the gating logic.

11. The method of claim 8, wherein determining that the memory array stores data that should be retained during reconfiguration further comprises:
  disabling the state machine using an output of the gating logic.

12. The method of claim 8, wherein reconfiguring the programmable logic comprises performing a partial reconfiguration where at least one communication interface in the integrated circuit remains active.

13. The method of claim 8, further comprising:
  receiving from a user an indication whether the data in the memory array should be retained during reconfiguration.

14. A reconfigurable integrated circuit, comprising:
  programmable logic;
  a memory array;
  control logic configured to:
    configure the programmable logic into a first configuration;
    reconfigure the programmable logic into a second configuration, wherein reconfiguring the programmable logic comprises:
      determining that the memory array stores first data that should be retained during reconfiguration;
      retaining the first data in the memory array when reconfiguring the programmable logic;
  a state machine for clearing the memory array when reconfiguring the programmable logic, wherein the state machine is external to the memory array; and
  gating logic configured to enable the state machine when reconfiguring the programmable logic so that the memory array is cleared and disable the state machine when reconfiguring the programmable logic so that the first data is retained in the memory array, wherein the gating logic receives a save signal indicating whether the memory array stores data that should be retained during reconfiguration and a masking signal that masks a global write enable signal.

15. The reconfigurable integrated circuit of claim 14, wherein the memory array stores configuration data used by the control logic when configuring the programmable logic into the first configuration,
  wherein the control logic is configured to reconfigure the programmable logic into the second configuration using the configuration data stored in the memory array as well as a bitstream received at the reconfigurable integrated circuit.

16. The reconfigurable integrated circuit of claim 15, wherein the configuration data represents commonalities between the first configuration and the second configuration.

17. The reconfigurable integrated circuit of claim 14, wherein the memory array stores user data that was processed by the programmable logic when in the first configuration, wherein the control logic is configured to, after performing the reconfiguration, retrieve the user data from the memory array and instruct the programmable logic to process the user data using the second configuration.

18. The reconfigurable integrated circuit of claim 14, further comprising:
  a second memory array,
  wherein the control logic is configured to:
    determine that the second memory array stores data that should be cleared during reconfiguration, and
    clear the second memory array during reconfiguration.

19. The reconfigurable integrated circuit of claim 14, wherein reconfiguring the programmable logic comprises performing a partial reconfiguration where at least one communication interface in the reconfigurable integrated circuit remains active.

* * * * *

UNITED STATES PATENT AND TRADEMARK OFFICE
CERTIFICATE OF CORRECTION

PATENT NO. : 10,963,170 B2
APPLICATION NO. : 16/262420
DATED : March 30, 2021
INVENTOR(S) : Subodh Kumar et al.

It is certified that error appears in the above-identified patent and that said Letters Patent is hereby corrected as shown below:

In the Specification

Column 4, Line 17, Delete "1206" and insert -- 120B --, therefor.

Column 6, Line 60, Delete "1006" and insert -- 100B --, therefor.

Column 7, Line 6, Delete "1006." and insert -- 100B. --, therefor.

In the Claims

Column 12, Line 3, In Claim 1, after "array" delete "block".

Signed and Sealed this
Twenty-first Day of September, 2021

Drew Hirshfeld
*Performing the Functions and Duties of the
Under Secretary of Commerce for Intellectual Property and
Director of the United States Patent and Trademark Office*